US008094324B2

(12) United States Patent
Ferlitsch

(10) Patent No.: US 8,094,324 B2
(45) Date of Patent: Jan. 10, 2012

(54) COMBINED HOST AND IMAGING DEVICE MENU INTERFACE

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1354 days.

(21) Appl. No.: 10/922,430

(22) Filed: Aug. 19, 2004

(65) Prior Publication Data

US 2006/0039012 A1 Feb. 23, 2006

(51) Int. Cl.

| | |
|---|---|
| ***G06F 3/12*** | (2006.01) |
| *G06K 15/00* | (2006.01) |
| *H04N 1/60* | (2006.01) |
| *G03G 15/00* | (2006.01) |
| *G06F 15/16* | (2006.01) |
| *G06F 3/00* | (2006.01) |

(52) U.S. Cl. ...... 358/1.1; 358/1.13; 358/1.14; 358/1.15; 358/1.9; 399/9; 399/81; 709/218; 709/219; 715/733; 715/740

(58) Field of Classification Search ................... 358/1.1, 358/1.15, 1.13, 1.14, 1.18, 1.9, 450, 302; 235/376; 250/236; 318/565, 600, 563, 601, 318/607, 610; 715/810, 748, 805, 772, 762, 715/764, 736, 740, 744, 760; 700/186, 56, 700/17, 20, 65, 83; 709/219, 220, 222, 217, 709/229, 225; 707/1, 10; 118/726, 727, 118/730; 710/62; 348/207.2; 345/169, 520, 345/522, 564

See application file for complete search history.

(56) References Cited

U.S. PATENT DOCUMENTS

| | | | | |
|---|---|---|---|---|
| 5,699,494 | A | 12/1997 | Colbert et al. | |
| 5,727,135 | A * | 3/1998 | Webb et al. | 358/1.14 |
| 5,956,487 | A * | 9/1999 | Venkatraman et al. | 709/218 |
| 7,239,409 | B2 * | 7/2007 | Parry | 358/1.15 |
| 2002/0030836 | A1 | 3/2002 | Motoyama et al. | |
| 2003/0011640 | A1 | 1/2003 | Green et al. | |
| 2003/0212744 | A1 * | 11/2003 | Dunlap et al. | 709/204 |
| 2005/0018229 | A1 * | 1/2005 | Gusler et al. | 358/1.13 |

FOREIGN PATENT DOCUMENTS

| | | | |
|---|---|---|---|
| EP | 0903928 | A2 | 3/1999 |
| EP | 0903928 | A3 | 4/2002 |

* cited by examiner

*Primary Examiner* — King Poon
*Assistant Examiner* — Neil R McLean
(74) *Attorney, Agent, or Firm* — Jon M. Dickinson, PC

(57) ABSTRACT

An imaging method enabling spontaneous, single-site implementation of, and control over, the execution of an imaging job employing the combinable native functionalities and related user-accessible controls of plural, currently available, imaging-related instrumentalities. This method features the steps of (a) establishing, with respect to a selected plurality of such instrumentalities, an appropriate instrumentality-intercommunication capability, (b) utilizing that established capability, enabling the suitable presentation, adjacent the location of at least one of such instrumentalities, of an active user combinational interface which, in relation to a user-intended imaging job, provides, via that interface, user-chooseable selection access to different functionalities and control combinations drawn from the availability of all of such instrumentalities' functionalities and controls, and (c) in response to interface designation-invocation by a user of such presented and combined functionalities and controls, executing the imaging job in the context of utilizing all of the so-user-chosen functionalities.

1 Claim, 3 Drawing Sheets

COMBINED HOST AND IMAGING DEVICE MENU INTERFACE

BACKGROUND AND SUMMARY OF THE INVENTION

This invention relates to digital imaging, and more particularly to methodology which enables spontaneous, single-site invocation of an imaging job through a unique, combinational user interface that offers access to the respective native functionalities and controls of plural, currently available, networked, imaging instrumentalities. These instrumentalities, only a few representative ones of which are specifically discussed hereinbelow, take the form of walkup digital imaging devices in categories including a host computer (or host), a printer, a copier, a scanner, a facsimile machine, a multifunctional peripheral device, an electronic whiteboard, a document server, a CD or DVD burner, digital cameral and others.

When a user operates a digital imaging device, such as a multi-function peripheral (MFP) as a walkup operation (e.g., copy, scan, document server), use of the device for a hard- or soft-copy operation is limited to the controls exposed, and to the function provided, by the device.

Traditional control and operation from the front panel (e.g., control panel, operator's panel, etc.), and the functionality of an imaging device, such as an MFP device, has been limited to the controls exposed, for example, by the copier functionality contained within the device.

This level of utility is limiting, in that (1), one cannot exploit functionality provided by a companion host, and (2), one cannot perform new image rendering and sheet assembly operations without upgrading the device firmware and control panel.

A recent improvement to digital imaging devices involves the ability to open a device's front panel as a remote interface to a host-based process. In this approach, a host process communicates a user interface (such as in using a markup language) to an imaging device. The device displays the host's user interface (UI) on a touch panel screen through a touch panel controller. The touch panel controller then sends back responses (e.g., buttons depressed) to the host process. The imaging device makes no interpretations of the responses. That is, it merely acts as a remote UI. The host process then performs requested custom actions, which may include operating the digital imaging device remotely, such as in a network scan or print job.

This approach is still limiting in that (1) the controls are limited to controls pre-known by the host process, and (2) operation of the imaging device is limited to operations that can be controlled via the network interface.

Thus, there is a desire for an effective method to combine the control/functionality of a host and imaging devices for a walkup operation without the host or such a device having pre-known knowledge of the each other's controls/functionalities.

This invention discloses an effective method for a user to control an imaging device (or plural devices) through a touch panel user interface that combines each device's native controls/functionalities and a remote host's controls/functionalities. Such control may be made available to a user at the locations of all, or only some, of a collection of networked imaging devices.

The invention, for example, allows a user to perform a walkup hard/soft copy operation, and to select input, rendering and outputting settings based on, say, a copier's native functionality, and image preprocessing (i.e., between input and rendering process) based on a host's functionality.

According to the invention, a host process and each associated imaging device has an established bi-directional communication for operating a touch panel display (or an embedded web page). The host process sends to the device a host-specific control panel menu. The device process displays both the device's native menus and the host menu. The user selects input, rendering, assembly and outputting options from the device's native menus. The user can additionally select image preprocessing options from the host menu. Examples of image preprocessing options involving a host and a copier device are:

1. Changing the page order of images within a multi-page imaging job for sheet assembly not supported by the device.
2. Embedding a custom watermark not supported by the device.
3. Processing the image, such as half-toning and red-eye removal, in a manner that is not supported by the device.

Once the user has selected the options and initiated a copy operation, the copier device does the following:

1. Inputs the document(s)/image(s) (e.g., hard-copy scan from document feeder) according to the input settings on the copier's native menus.
2. Converts the input into scanned image data (e.g., TIFF).
3. Sends the scanned image data and host menu settings to the host process.
4. The host process processes the scanned image data according to the host menu settings.
5. The host process sends back the processed scanned image data back to the copier.
6. The copier continues processing the host-processed scanned image data according to the remaining copier's native menu settings (e.g., rendering, assembly, outputting).

All of the features and advantages offered by the methodology of the present invention will become more fully apparent as the description which now follows is read in conjunction with the accompanying drawings.

DETAILED DESCRIPTION OF THE INVENTION

Figure 1:
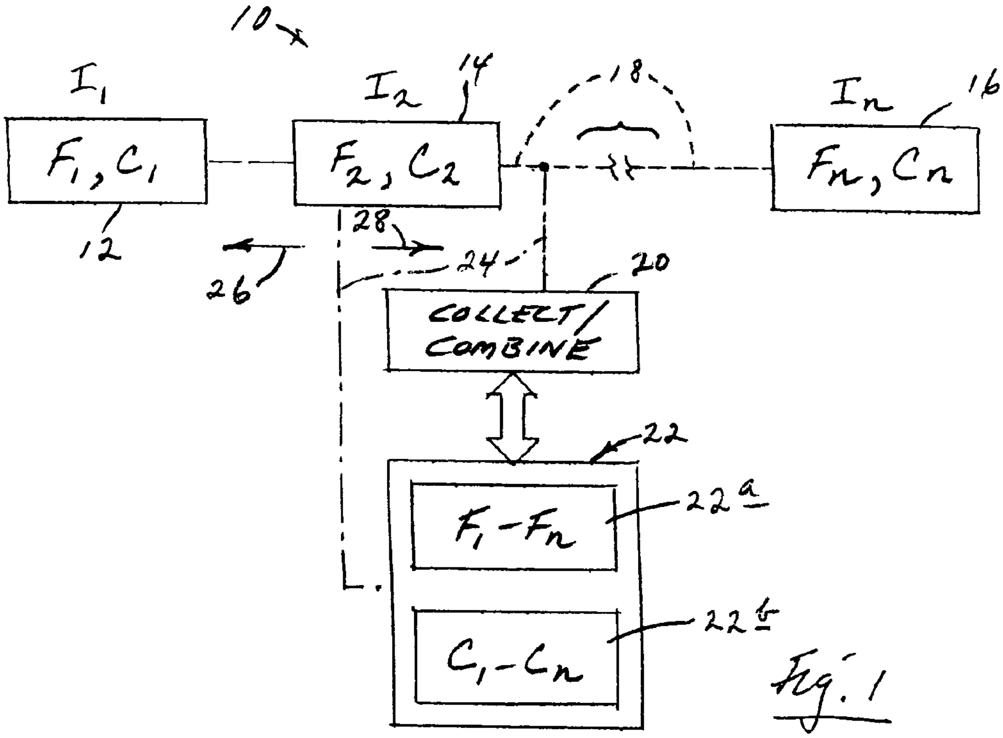
FIG. 1 is a fragmentary block/schematic diagram illustrating a preferred and best-mode manner of practicing the invention in a networked collection of plural imaging instrumentalities.
Figure 2:
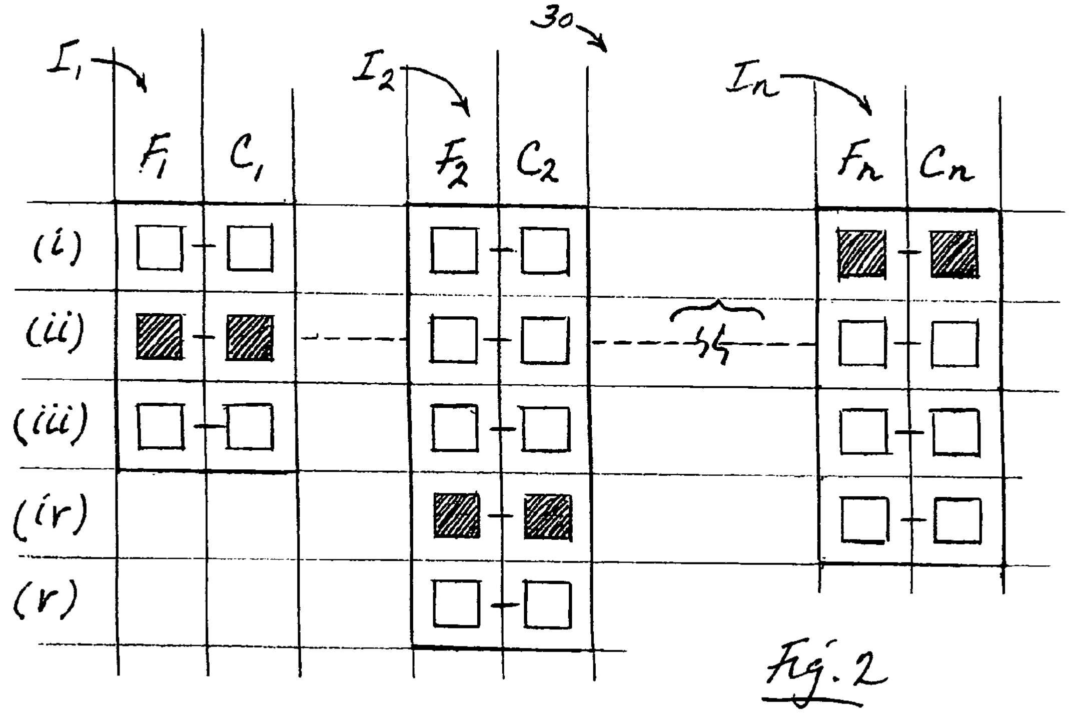
FIG. 2 is a related schematic diagram illustrating imaging job invocation utilizing functionalities and controls provided respectively by different instrumentalities shown in FIG. 1.
Figure 3:
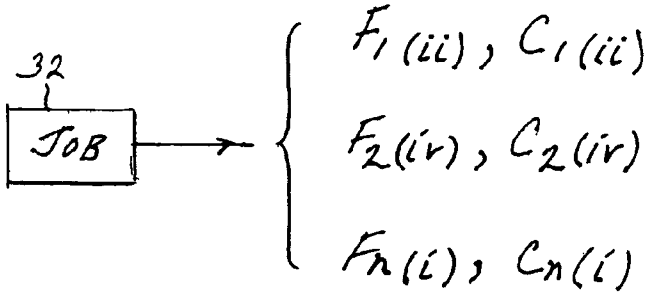
FIG. 3 illustrates schematically a specific implementation protocol for the imaging job pictured as being invoked in FIG. 2.

Turning now to the drawings, and beginning with FIGS. 1-3, inclusive, the overall methodology of a preferred and best-mode manner of practicing the present invention are shown generally at 10 in FIG. 1. This methodology is referred to herein variously as:

FIGS. 2-7, inclusive, illustrate how the methodology of the present invention handles what is referred to herein as the intact entirety of an imaging job via routing of the job as a whole for implementation, with respect to it, of selected functionalities and controls made available by different ones of the relevant, plural imaging instrumentalities. Routing of an imaging job as a whole means that portions of that job are not separated for individual processing. Additionally, these several figures, and particularly FIGS. 4-7, inclusive, illustrate that a finished imaging job is outputted as a whole by just one imaging instrumentality.

(a) a method enabling spontaneous, single-site implementation of, and control over, the execution of an imaging job employing the combinable native functionalities and related user-accessible controls of plural, currently available, imaging-related instrumentalities; and (b) an imaging job process associated with a networked collection of plural imaging-related instrumentalities each having respective, associated imaging-related functionalities and/or controls.

In FIG. 1, blocks 12, 14, 16 labeled $I_1$, $I_2$, $I_n$, respectively, represent three such imaging-related instrumentalities (devices), wherein $I_2$ will be treated herein as being a host computer, or a host, and $I_1$ and $I_n$ as being copiers, networked together as a plurality, or collection, of devices via any suitable form of communication network, such as that represented in FIG. 1 by dashed line 18. Network 18, with regard to functionality, is referred to herein as establishing an instrumentality-intercommunication capability (i.e., utilizing network intercommunication) via which, in accordance with practice of the invention, device-specific imaging functionalities and controls are gathered (collected) and combined, see block 20 in FIG. 1, to create a combined, or combinational, user interface, see block 22 in FIG. 1, which will be presented (made available) to imaging-job-requesting users. The invention practice of making this special interface available to users by way of network 18 is also referred to herein as utilizing network capability to enable presentation of a combinational interface. It is further referred to as presenting an operative user interface containing representative surrogates of various device imaging controls.

Within blocks 12, 14, 16 appear the letters (subscripted) "$F_1$, $C_1$" (block 12), "$F_2$, $C_2$" (block 14), and "$F_n$, $C_n$" (block 16). The subscripted letters F, C, stand for and represent the respective imaging functionalities (F) and user controls (C) associated with the device blocks. Dash-dot lines 24 represent appropriate communication connections used to gather the F, C features of the networked devices, and the two, opposed-direction arrows 26, 28 represent F, C, "data collection" among the plural, networked devices.

Combined interface 22, which is created as a step in the practice of this invention, contains displayable reference surrogates of all of the collected device functionalities ($F_1$-$F_n$), and all of the collected device controls ($C_1$-$C_n$), see sub-blocks 22*a*, 22*b*, respectively. Interface 22 may be organized in different ways, such as (a) in a device-specific, differentiated manner, or (b) in a device-non-specific, non-differentiated manner. In the first organization, presentation of interface 22 to a user, in accordance with practice of the invention, will inform the user which functions/controls relate to which networked devices. In the second-mentioned organization, that kind of information is not made available.

FIG. 2 generally illustrates at 30 the full range of imagery functionalities and controls which are provided by networked devices $I_1$, $I_2$ and $I_n$. Device $I_1$ is seen there to offer three sets of functionalities/controls, $F_{1(i\text{-}iii)}$, $C_{1(i\text{-}iii)}$, device $I_2$ five sets ($F_{2(i\text{-}v)}$, $C_{2(i\text{-}v)}$, and device $I_n$ four such sets $F_{n(i\text{-}iv)}$, $C_{n(i\text{-}iv)}$. Interface 22 is designed, according to the invention, to make all of these F, C assets available for use in implementing a user-requested imaging job.

In the particular networked collection of devices being employed herein for illustration purposes, each device is a walkup device which possesses a screen for displaying a user interface suitable for invoking a requested imaging job, such as job 32 represented schematically by a block so-numbered in FIG. 3. Job 32 is seen to be specified herein by a user (this practice shortly to be described to employ) the following functionalities and controls made available by devices $I_1$, $I_2$ and $I_n$: $F_{1(ii)}$, $C_{1(ii)}$; $F_{2(iv)}$, $C_{2(iv)}$; and $F_{n(i)}$, $C_{n(i)}$. Looking back at FIG. 2, one will see that small, square blocks which specifically represent these respective F and C assets are darkened to highlight their conditions of being "job specifications".

According to the manner of practicing the present invention now being described for illustrative purposes, interface 22 is presented to a user, upon selection for implementing a new imaging job, on the display screens at each and any of devices $I_1$, $I_2$, $I_n$. This presentation includes options for the user to select any of the functionalities and controls appearing in the combinational interface and currently available for use in the associated devices. The user invokes an imaging job by making a functionality and control selection at the site of one of devices $I_1$, $I_2$, $I_n$, and the job is then executed by appropriate routing then performed "by the interface" to call upon the cooperative functionalities of one or more of the appropriate, available device(s). This "routing" behavior is referred to herein as responding to user engagement of the combined interface and its contents to implement the requested device functionalities.

Thus, practice of the invention, in general terms, involves, with respect to an identified collection of plural imaging-related, networked devices: network communication to determine potentially available device functionalities and related controls; creation therefrom of a combined user interface capable of displaying all device functionalities and controls; presentation of that interface selectively at the site of each device preferably, though not necessarily, with a display of all, but only "currently available", functionalities and controls; and response to user invocation of an imaging job through the interface by routing portions of the job so as to implement the user's specific job completion requests.

Specific ways of performing determination of available device functionalities and controls, of creating an action interface as described, and of using this interface to route portions of imaging jobs appropriately, are numerous, are preferably conventional in nature, and are well within the general skills of those skilled in the art. Accordingly, details of these activities are not necessary herein, and are not presented.

Progressing from the above discussion about the present invention and its features, attention is now directed to FIGS. 4-7, inclusive. These block/schematic drawings are labeled with brief text in a manner which makes them substantially self-explanatory.

In the exemplary environment pictured and now to be discussed in relation to FIGS. 4-7, inclusive, an imaging device is controllable from a walkup operations panel (e.g., front panel, control panel) and/or embedded device web page. One component of the operations panel consists of a touch screen. The touch screen is typically implemented as an LCD device with a layer that can detect being depressed along a coordinate system mapped on the touch screen. The imaging device has a process that displays soft buttons (GUI controls) at specific locations on the touch screen that are associated with specific actions that can be performed by the device (e.g., duplex printing). The touch screen typically has multiple menus. The selection of displays may be selected (a) as a result of a hard button on the device, or (b) via default menus, device state, or selection of a soft button on another menu (i.e., menus chained together).

Additionally, and according to the invention, the device has an interface for bi-directional communication with a host process whereby the host process can transmit a menu description for display on the touch screen panel (e.g., or embedded web page), the device can render the menu on the touch panel and return responses (e.g., soft-buttons depressed) back to the host process. This, in simple two-device terms, involves the invention practice of learning about device functionalities and controls to generate/create a combinational interface.

Figure 4:
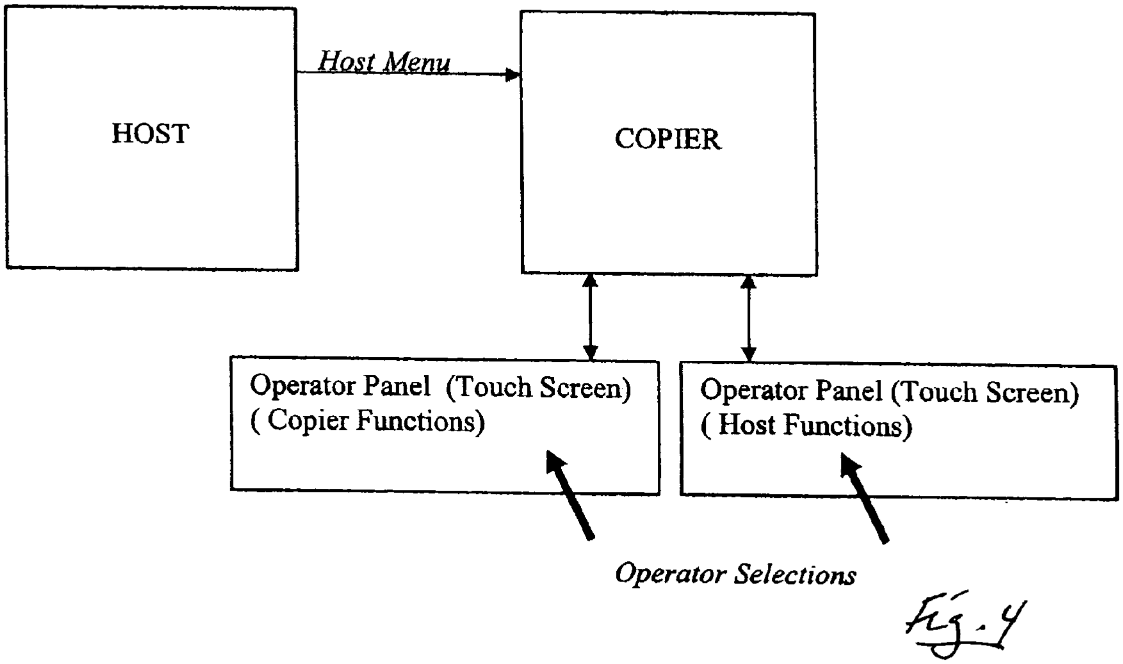
FIGS. 4-7, inclusive, illustrate practice of the invention in the context of implementing an imaging job in relation to a networked host computer and a copier (referred to as plural devices).

Beginning with FIG. 4, a host process running on a computing device, such as device $I_2$, establishes a bi-directional communication link with an imaging device (e.g., digital imaging copier), such as device $I_1$. The communication link may be over network 18 (e.g., TCP/IP, AppleTalk) or locally connected (e.g., USB, Parallel, Serial). The communication protocol may be built on a standard protocol (e.g., HTTP, XML) or be proprietary. It can also be any one of a variety of wireless protocols, such as Wi-Fi, Bluetooth and I.R.

The host process sends a description of the host-specific menu to the device via the bi-directional communication link. The host-specific menu description is in a format compatible with the touch screen controller (or web page) process, such as in Extended Markup Language (XML), or Hypertext Transmission Protocol (HTTP) format.

The device then makes the host-specific menu displayable on the touch screen (or embedded web page) panel, such as by: (1) a separate touch screen panel; (2) additional space on the touch screen panel; (3) a link to/from another touch screen menu.

When the user initiates a walkup (or web based) soft/hard input/output copy (imaging) job, the user may select settings from both the copier's native menus and the host-specific menus. Generally, the menus would be partitioned (differentiated) as follows:

Copier Native Menus

1. Input

Settings that relate to how the data is inputted. For example, the input data may be inputted as hard-copy document from the platen or automatic document feeder. The input data may be soft-copy image from a memory stick. Other settings may affect how input is initially processed into scanned image data, such as resolution, scale and cropping. Other settings may deal with access control, such as account codes and decryption keys or passwords.

2. Rendering

Settings that relate how the scanned image data is image processed, such as for page images. For example, the scanned image data may be converted from color to black and white, or grayscale, image enhancement technologies may be applied, selection of half-toning algorithms, page size, etc.

3. Assembly

Settings that relate to how rendered data is to be assembled for outputting. For example, number of copies, page ordering (e.g., booklet, N-up, reverse order), duplex print, cover sheets, etc.

4. Outputting

Settings that relate to how the rendered data is to be outputted. For example, hard-copy vs. soft-copy (e.g., network scan or fax job), destination (e.g., output bin or fax number), finishing (e.g., stapling, hole punch, folding, trimming, cutting), etc.

Host Specific Menus

1. Image Pre-Processing

Settings that relate to the host process performing preprocessing operations (e.g., before rendering) on the scanned image data.

For example:

a. Custom Watermarks.

b. Digital Signatures.

c. Steganography (encoded fingerprinting).

d. Half-toning.

e. Assembly (e.g., re-ordering images).

f. Content Filtering.

g. Access Control.

Figure 5:
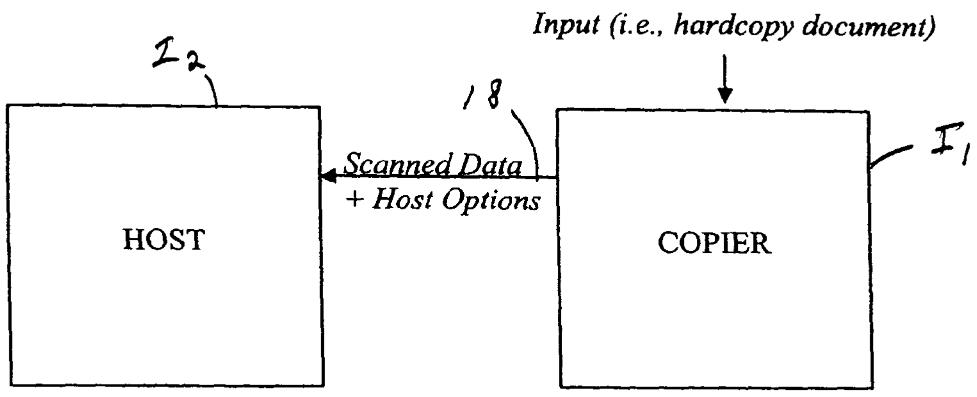

Switching attention to FIG. 5, upon initiation of a user-invoked copy operation, the copier inputs the input data according to the input options selected from the native copier menu and controls. The input data is then converted conventionally to scanned image data (e.g., TIFF, JPEG, Windows Bitmap), if not already in a format that is compatible with both the rendering process in the copier and the host image preprocessing process.

The copier then transmits the scanned image data, via the bi-directional communication link established in network 18, back to the host image preprocessing process along with the user responses (e.g., selections) to the host-specific menus. The response data may be in any form, such as XML. In an alternate embodiment, the scanned image data and/or host menu responses may be transmitted over a communication link other than the communication link established by the host process to send the host-specific menu screens to the copier.

The copy operation on the copier is then suspended until the copier receives back the scanned image data from the host process.

Figure 6:
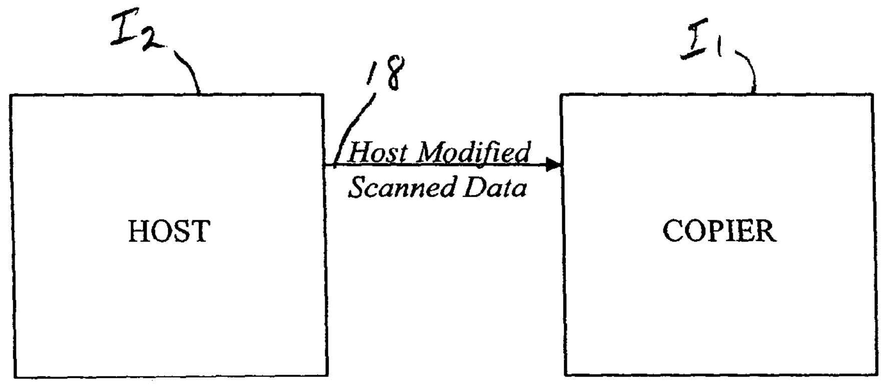

In FIG. 6, the host processes the scanned image data based on the received host-specific menu selections from the copier. As one example, the host process may contain a corporate specific watermark image that is not programmable on the copier and a response that indicates to add the watermark. For each scanned image, the host process embeds the watermark image into the scanned image.

In another example, the host process may support the addition of a variable data form cover page, which is not supported by the copier, and a response that indicates to add the cover page and the data (e.g., title) to fill into the cover page. The host process would, in this case, create a scanned image for the cover page, in the same format as that of the scanned image data, from the variable data formed with the inserted data, from data received from the copier, or from data predetermined by the host process. The image data representing the cover page would then be pre-pended to the scanned image data.

In still another example, the host process may support content filtering. In this case, the scanned image data is analyzed for content that is not authorized for copying (e.g., counterfeiting of monetary instruments).

The host process may also perform operations that do not result in the modification of the scanned image data, such as job auditing and job accounting.

When the host process has completed image preprocessing of the scanned image data, the modified scanned image, in the illustration now being given, is sent back to the copier via the bi-directional network communication link.

Figure 7:
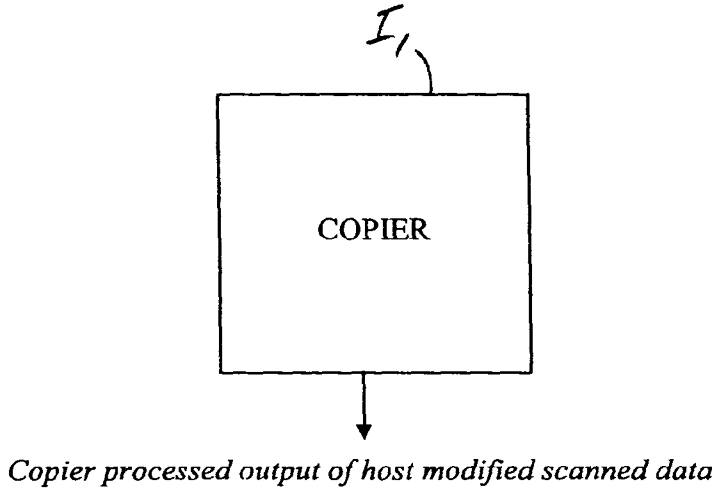

With reference now to FIG. 7, when the copier receives the host-modified scanned image data back from the host process, the copier resumes processing of the scanned image data, and does so according to the selections specified by the user on the copier native menus. These processes include, for example: (1) rendering the image data; (2) assembling the rendered data; (3) collation, outputting and finishing the assembled rendered data.

Thus, the methodology of the present invention provides a unique and efficient way of processing image jobs in a networked collection of plural imaging devices. By gathering information regarding the respective image-handling and image-processing functionalities and related controls of each of these devices, and by creating for presentation at the sites (all or some) of these networked devices, a combinational user interface as described herein, an imaging job invoked at one site can be handled for all of its required functionalities by a plurality of networked devices. Devices need not pre-know the capabilities of other devices for this efficient behavior to take place.

While a preferred and best-mode implementation of the invention has been disclosed herein, and certain modifications briefly indicated, other variations and modifications may certainly be made without departing from the spirit of the invention.

I claim:

1. An imaging-job-specific method utilizing display structure associated with a selected, single-site imaging instrumentality for enabling spontaneous, single-site control, by the selected instrumentality, over the execution of each single imaging job, employing, selectively, combinably and collaboratively, and specifically at the single site of the selected instrumentality, and via the mentioned, associated display structure, features of the different-instrumentality, native, imaging-activities functionalities and related user-accessible controls which are made available by selected ones of all of a plurality of currently available, operatively connected, different imaging instrumentalities, including features of such functionalities and controls that are furnished collectively, and if desired only, by plural such instrumentalities which are other than the mentioned, single-site, selected instrumentality, and wherein (a) each instrumentality has a respective user interface associated with its respective functionalities and controls, (b) the user interfaces of all of the different operatively connected instrumentalities are unknown to one another, and (c) the selected single-site instrumentality may be any one of the different instrumentalities, said method, with respect to the execution of a given, single imaging job, comprising establishing, with respect to a chosen plurality of such operatively connected instrumentalities, an appropriate instrumentality-intercommunication capability, utilizing that established capability, enabling the suitable, combined presentation, on the display structure associated with the selected instrumentality, of an active, singular-combined, integrated user combinational interface which, in relation to each given, user-intended imaging job, provides, via that singular interface, user-chooseable, simultaneous selection access to the various, different, instrumentality-specific, native, imaging functionalities and control combinations drawn from the availability of all of such instrumentalities' imaging functionalities and controls as reflected in the respective instrumentalities' image-handling user interfaces, including drawn from the availability of the functionalities and controls associated with plural imaging instrumentalities which are only other than the selected instrumentality, such presentation enabling displaying of the mentioned, combinational, integrated, singular interface including the capability for displaying therein instrumentality functional information selectively both (a) in an instrumentality-non-specific, non-differentiated manner, and (b) in an instrumentality-specific, differentiated manner, and in response to interface designation-invocation by a user of such presented and combined, individual-instrumentality, native functionalities and controls, executing the intact entirety of a given imaging job in the context of collaboratively and cooperatively-combinedly and selectively utilizing, via appropriate, inter-instrumentality routing, all of the so-user-chosen and designated, different, native functionalities, whereby a single, given imaging job may be executed, for finished outputting by one of the plural instrumentalities, by the uses of plural, native functionalities and controls that are offered by different, individual imaging instrumentalities.

* * * * *